Dec. 11, 1934.    G. MITZLAFF ET AL    1,983,917
METHOD OF CONTROLLING ELECTRIC DRIVES FOR SHIPS
Filed March 7, 1932    3 Sheets-Sheet 1

Dec. 11, 1934.　　　G. MITZLAFF ET AL　　　1,983,917
METHOD OF CONTROLLING ELECTRIC DRIVES FOR SHIPS
Filed March 7, 1932　　　3 Sheets-Sheet 3

Patented Dec. 11, 1934

1,983,917

UNITED STATES PATENT OFFICE 1,983,917

METHOD OF CONTROLLING ELECTRIC DRIVES FOR SHIPS

Georg Mitzlaff and Robert Bruderlink, Mannheim, Germany, assignors to Aktiengesellschaft Brown, Boveri & Cie, Baden, Switzerland, a joint-stock company Application March 7, 1932, Serial No. 597,374
In Germany March 7, 1931

15 Claims. (Cl. 172—8)

In modern high-speed ships of large size it is impossible to use a single Diesel engine for driving the ship's shaft because up to the present Diesel engines having the necessary power are not technically possible. Such ships are therefore equipped with several such engines driving through suitable transmission numbers one or more shafts.

Electric machines have proved in a high degree suitable for transmitting the power. Direct-current machines with Leonard connection have often been used, and sometimes alternating-current synchronous generators combined with alternating-current asynchronous motors. Direct-current machines have the disadvantage of being heavy and furthermore require specially careful attendance on account of possessing sensitive parts such as the commutator and brush gear. Also, when using direct current the effect of short-circuits is more dangerous and the use of high voltages is accompanied by greater difficulties than is the case when an alternating current system is employed. With alternating current it is also possible to build the propelling motors as asynchronous motors with eddy current or squirrel-cage rotors, the superiority of which, when compared with slip-ring rotors, is well known. When using these, the plant can be so designed that the high voltage need only be supplied to stationary parts.

Despite the unmistakable advantages of the alternating-current system over the direct-current, there are certain important disadvantages and difficulties connected with the former, the object of the invention being to overcome these. Contrary to other propelling machines such as steam turbines, the Diesel engine has the property that its construction becomes unsuitable when intended for high powers. Above all this is connected with the fact that the speed has to be considerably reduced for high powers. It is, therefore, favourable for the conditions of the Diesel-electric ship's drive to use a comparatively large number of high-speed Diesel generators which operate in parallel on a busbar system which supplies the propelling motors. In addition to the advantage of lower costs, smaller space required and the lower weight of a high-speed set, there is also an important advantage for the general arrangement of the ship in that the separate sets of machinery can be installed in different compartments and can easily be made to suit all possible conditions of accommodation.

The employment of a number of sets of machinery presuppose a solution of the question of how they can be controlled according to service requirements, that is, corresponding to the variable speed of the ship. An economical transmission of power demands from the first that the propelling motors operate with only a small slip (zero slip where synchronous motors are concerned). This imposes that the regulation of the propeller speed may not be a slip regulation of the motors, but must be effected by a corresponding alteration of the frequency and hence the speed of the generators. This alteration of the frequency will occur automatically when only the number of Diesel sets is increased or decreased according to the ship's speed requirements. In order that the Diesel sets which are newly switched into operation become fully loaded automatically, their governors are adjusted to a higher speed than that corresponding to the ship's speed. The control of the ship's speed is therefore accomplished in a number of stages equal to the number of generator sets.

Figure 1:
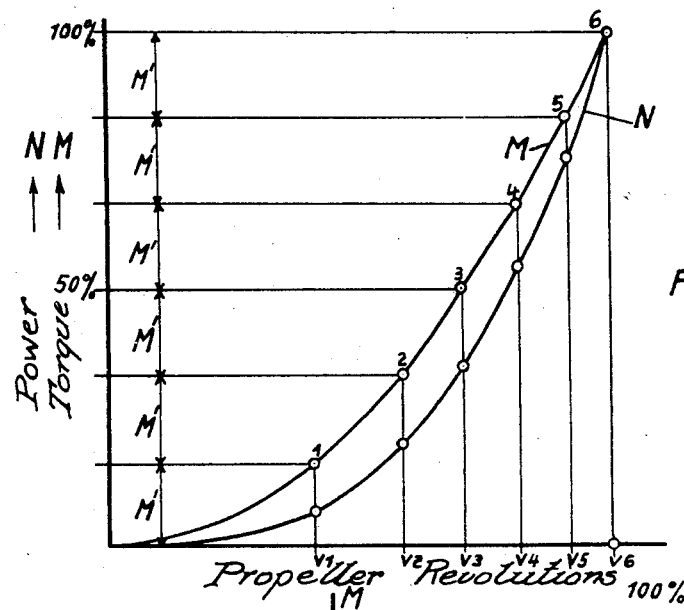
Fig. 1 is a graphical illustration of the result upon the system according to the number of generators in operation.

Fig. 1 of the drawings shows how the speed of the generators, the frequency of the system and the speed of the ship vary clearly and compulsorily according to the number of generators switched into operation. Above the base line showing the ship's speed is indicated the torque M to be overcome by the propeller, and the power N to be developed by the propelling motor. All these magnitudes are expressed as a percentage of the maximum value. The torque M increases practically as the square, and the power N practically as the cube of the ship's speed. It is, for example, assumed that there are six generator sets. Each Diesel set switched out comes automatically on to full load and develops a torque M' referred to the propelling motor. Thereby each number of sets in operation as apportioned by the torque curve M, has its corresponding ship's speed and its corresponding propeller output clearly determined. It is hereby assumed that the Diesel engines can develop their rated torque for a range of 40 to 100% of their rated speed, which about corresponds to the present day state of development in Diesel engine design.

The governors of all the Diesel engines which are in operation must lie up against their stops and, therefore, as already mentioned always be set for the higher no-load speeds, so that the engines are always under load. This condition can easily be fulfilled by coupling together the governors of all the engines and altering their setting by one common movement. In service, therefore, also the governors of the engines which are not switched in and are at a standstill, will be adjusted in synchronism with the governors of the other machines.

In the event of the previously described step regulation of the speed being inadequate, as for example during the flotilla operations of warships, a fine regulation can be obtained in a simple manner by adjusting the common governing apparatus for a smaller speed, whereby the rated torque of each individual Diesel engine is decreased. In this way the whole speed range can be continually passed over.

This common governor regulation is, however, also for other reasons, important. The switching-in of the separate sets would, if it had to be done in the usual way after first synchronizing, occupy a great amount of time and in any case only be possible if automatic synchronizing devices were used. These would so complicate the equipment and the operation of the ship that for this reason alone, whenever possible, alternating current transmission for Diesel electric marine drives has so far been avoided.

According to the invention, however, this switching-in of the sets can be accomplished in a simple and reliable manner by utilizing certain special features of the propeller drive. The switching-in is to be performed according to the invention by first rendering the generators free of voltage in that they are previously de-excited, and then the other sets are switched in. After the switch is closed the direct-current excitation is again resumed, whereupon all machines synchronize themselves without any abnormal current rushes occurring because all the Diesel engines, as soon as their generators are not excited and without load have the same no-load speed. In general this method cannot be applied to other electrical drives and is only possible with a propeller drive on account of the peculiar character of the torque transmitted to the propeller.

Figure 2:
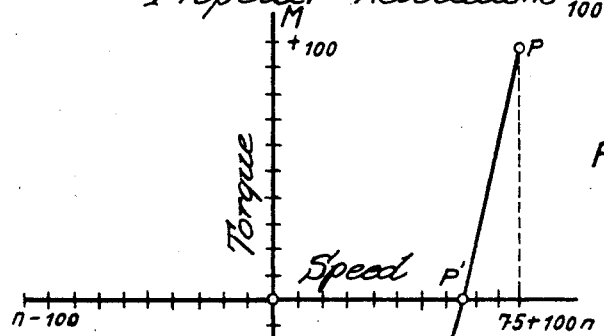
Fig. 2 is a graphical illustration of the torque exerted on the propeller on a basis of speed.

Fig. 2 of the drawings shows the characteristic curve of the torque M exerted by the water on the propeller on a basis of speed $n$ expressed as a percentage of the rated values, under the assumption that the speed of the ship remains constant. For example, the ship is travelling at full speed which would correspond to the point P. The propeller rotates at a nominal speed of 100% and would transmit a rated torque of 100%. If the current supply to the propelling motor is switched off the propeller speed decreases as a result of the load. At about 75% of the rated speed, however, the counter torque exerted by the water, becomes zero, and the propelling motor continues to run unloaded at this speed. The propeller speed cannot, therefore, drop any further or the propeller stop entirely, but it will be carried along by the motion of the ship and revolve in the water without resistance. If the plant were such that the motor had to operate against a torque dependent upon another speed than that actually occurring in a ship's drive, such as against a constant torque, then the motor would soon be braked to a standstill after the voltage had been switched off. The generators would then, after re-excitation, have to accelerate the propelling motors completely from a standstill up to the service speed, a condition which would make the method of connections according to the invention quite impossible.

If a fine regulation of the ship's speed is not required then it is not necessary to move the governor setting. The coupling of the governors can be dispensed with and the governors of the individual machines can be set for a common no-load speed which has a sufficient margin above the maximum service speed.

The peculiarity of this propeller drive according to the invention enables a still further improvement and technical advance to be obtained with this plant. For the same reason as when switching in the Diesel sets the voltage supply to the plant can also be interrupted when switching out machine units, changing over star-delta connections of the propelling motor to obtain a better power factor at light load, changing over poles etc. also when reversing the propelling motors. In this way it is possible to construct all switches as light and cheap disconnecting switches and heavy current switches can be avoided. The advantages are obvious. Corresponding to the large number of generators, a comparatively large number of switches are necessary which when required for large currents are heavy and occupy a great deal of space. Furthermore oil circuit breakers, on account of the possibilities of an explosion or an oil fire, are accompanied by a danger which is more highly appreciated on ships than with stationary plants.

The new method is not fundamentally restricted to Diesel engines for driving the electric generators, but can be used everywhere where the current generating plant is divided into several machine units of which the electrical generators operate in parallel on the same bus bars.

It has already been mentioned that in order to reverse the direction of rotation of the propelling motors of a ship's electrical drive the voltage supply to the plant can be stopped by interrupting the excitation of the synchronous generators providing the voltage. In the introduction it is also mentioned that it is an advantage to employ asynchronous motors with eddy current or squirrel cage rotors for driving the propeller, because, as regards safety of operation these are much superior to slip-ring and synchronous rotors. For reversing, certain features of the short-circuited rotors are unfavourable when compared with slip-ring rotors.

According to a further development of the invention the following disadvantages which are referred to are overcome to a degree which enables them to be acceptable in practice. It is well known that during reversing, the ship's machines are severely overloaded. After each of two leads to the stator winding of each motor have been reversed, during which time the excitation is interrupted, the excitation of the generators must in addition be temporarily greatly strengthened. This last measure is based on the fact that the short-circuit impedance of the squirrel-cage motor is very much smaller than its impedance during normal running. If, for example, it is desired to reverse at normal voltage, in order to obtain large torques it is necessary to have about double the rated excitation current for the generators, while at the same time the rotor current of the propelling motor and also of the generators attains about four times the rated value. Automatic adjustment of the correct excitation can be obtained if a quick-acting regulator is provided which regulates to approximately a constant relation of voltage to frequency.

The electrical equipment can according to the invention be designed so that without any special increase in weight the increased output can be obtained during the short time taken to reverse. The limitation of the output is not in the electrical part but in the prime movers. It is well known that Diesel engines cannot develop much more than their rated torque without special devices being provided.

By means of the following method the overloading of the Diesel engines or the installation of a diesel engine plant enlarged to provide for the overload can be avoided. A condition for this method is, however, that the ship is equipped with at least two propelling motors which are supplied from two identical Diesel-electric engine sets. The peculiar relation between the torque exerted by the water on the propeller and the speed when the ship is in motion, is shown in Fig. 2. A further development of the invention consists in connecting the busbars of both generator sets electrically during reversing, and while the excitation of the generators is interrupted first reversing only one motor during which time the other motor remains adjusted for the original direction of rotation, and only then when the reversed motor has approximately attained its normal slip in the new direction of rotation is the next motor reversed the excitation of the generators being again temporarily interrupted.

Figure 3:
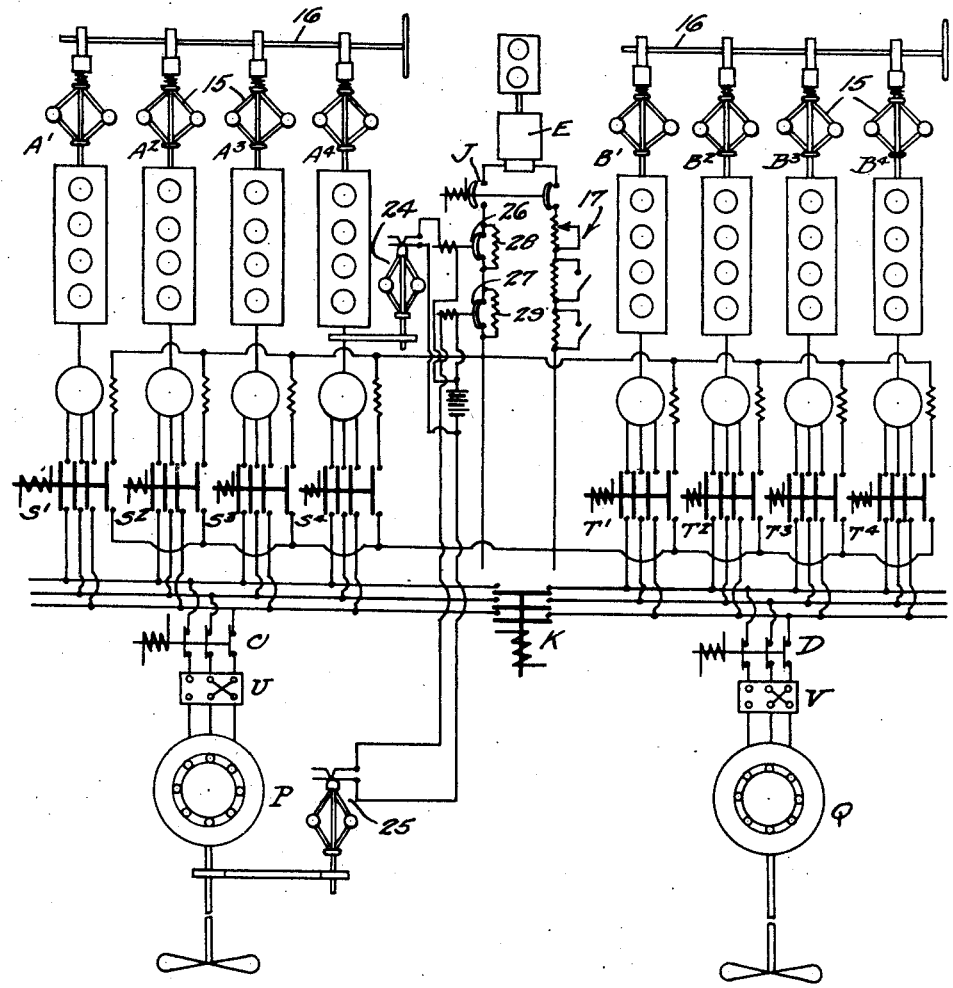
Fig. 3 shows diagrammatically a Diesel-electric plant employing dual symmetrical sets according to the invention.

Fig. 3 diagrammatically illustrates a Diesel electric ship propulsion system employing two propellers driven by motors P and Q, respectively. The motor P receives power from a unit of four Diesel-generator sets $A^1$, $A^2$, $A^3$ and $A^4$ and the motor Q from an identical unit of four sets designated $B^1$, $B^2$, $B^3$ and $B^4$. Each Diesel engine is provided with a centrifugal governor 15 and a common control means 16 is provided for coupling together the governors of each set so that they may be simultaneously adjusted to vary the no-load speed of the Diesel engines of each set. An exciter E is provided for furnishing direct current excitation to each of the generators and generator switches $S^1$, $S^2$, $S^3$, $S^4$, $T^1$, $T^2$, $T^3$ and $T^4$ are provided for making and breaking the circuits from the individual generators to the bus bars 18 and 19 as well as the excitation circuits of the respective generators. A common exciter switch J is provided for making and breaking the main exciter circuit during the switching operations.

To provide for variation of the excitation of the generators as heretofore described, a series of resistances and shorting switches 17 are placed in the excitation circuit.

For the purpose of weakening the excitation of the generators when the speed of the Diesel engines or the speed of the propeller motors falls below an admissible minimum, centrifugal switches 24 and 25, respectively, are provided for opening the switches 26 and 27 so as to cut in either of the resistances 28 and 29, respectively, in the main excitation circuit.

Switches C and D are provided for connecting or disconnecting the propeller motors from the bus bars, the switches U and V are reversing switches for the respective motors P and Q, and a switch K may be closed to connect the bus bars 18 and 19 together when this arrangement is desired.

The various switches shown, except the centrifugal switches, may be remotely controlled or manually operated, and to avoid confusion, the control circuits have not been fully illustrated.

In operation, with all of the Diesel engines necessary for the required power, when it is desired to start up ahead, the main exciter switch J being open and the engines operating at the same no-load speed, the switches $S^1$ and $T^1$ of generator units $A^1$, $B^1$ are closed and then the main exciter switch is closed. The propeller motors are thereby energized and each brings its propeller up to a speed corresponding to operation on the output of one dynamo. When it is desired to increase the speed, the main exciter switch J is first opened, and this results in the unloading of the previously connected Diesel sets and their speed therefore rises to the no-load limit. As many of the remaining generator switches as deemed necessary are then closed and finally the main exciter switch is closed, whereupon all of the connected Diesel sets will be simultaneously loaded.

At the time of closing the main exciter switch to complete each switching step, the excitation of the generators is momentarily reinforced, for example by closing and opening the shorting switches 17.

Reversing operations will be described on the assumption that the ship is travelling full speed ahead and that it has to be reversed to astern running as quickly as possible. All generators A and B of both sets and also both propelling motors P and Q are in operation at the rated output. The coupling switch K can be either in the closed or open position. For the purpose of reversing, the excitation of both generator sets is first arrested and then the reversing switch U of the one, for example the left-hand side motor, put over, during which time the other propelling motor Q still remains running ahead. At the same time the coupling switch K is closed. When the excitation is switched in again the excitation current is adjusted either by hand or automatically to a correspondingly high value. The proceedings of the first part of the reversing process are characterized by the feature that as a result of the great load, due to the reversed propelling motor P, the speed of the Diesel engines and thereby the electrical frequency of the whole system begins to drop rapidly and the total output of the combined generators is transferred increasingly to the reversed motor P. Already at about 75% of the original frequency the propelling motor Q only runs light, as is shown by the torque curve in Fig. 2. When the frequency sinks still lower the propelling motor Q becomes a synchronous generator and supplies effective power to the system. From this instant onwards this propeller takes power from the kinetic energy of the ship, although the propeller is connected for ahead running, and also assists in the braking action. It thereby supplements the power of the Diesel engines so that their speed does not decrease appreciably further. Only after the reversed propelling motor P has attained approximately its normal slip in the reverse direction is the reversing switch V of the second propelling motor Q put over, the excitation of the generators being again interrupted during this period, so that when the excitation is switched on again this motor runs in the new direction of rotation.

Naturally in cases where the reversing does not require to be performed especially rapidly, it is possible to first reverse one motor, the other one remaining disconnected during this time. In this way the Diesel engines are not assisted by the effective power which is obtained from the kinetic energy of the ship in the manner described.

It can be an advantage during the first part of the reversing period to change over the propelling motor Q from delta to star connection so that it operates generatively to a lesser degree. When the propelling motors are provided with stator windings having changeable pole connections it is possible by changing over one or both of the motors to a larger number of poles to improve the reversing conditions still further.

If there are more than two sets of generators each with a propelling motor, the new method described can be applied in the same manner.

As described, the reversing of the direction of rotation of the propeller is accomplished according to the invention by first interrupting the excitation of the generators, then interchanging by means of a change-over switch two leads to the winding of the propelling motor, and finally switching the excitation in again. When performing this in itself simple set of actions there are, however, a number of special peculiarities of a ship's drive to be considered and taken account of by adopting a certain method of operation, and also by using special devices for this purpose.

With such a plant it is well known that the frequency of the system and the speed of the generators and the propeller shaft are compelled to vary with the number of generator units in operation. In consequence the busbar voltage also varies. It is not readily discernible which law it is most advantageous to follow when regulating the busbar voltage during the switching in and out of the generators. If, for example, the regulation is performed under consideration for a constant ratio between voltage and frequency, this corresponds approximately to a constant excitation current strength of the generators. Then the power factor of the motor drops when the load is small and the speed low, that is, when a smaller number of generators are in operation. When the voltage is reduced approximately as the square of the line frequency, it is possible for the power factor of the motor to maintain its maximum value even for a smaller load and lower speed. It is assumed that when employing this last form of regulation the efficiency of the transmission is at its highest. Detailed calculations and tests show, however, that the current-heating losses are a minimum and in consequence the efficiency of the transmission becomes a maximum when the first mentioned form of regulation is adopted, that is, when the ratio of the voltage to the frequency is maintained constant and the number of windings of the propelling motor is increased for the smaller load. This last condition can be achieved in a very simple manner by changing over the motor winding from delta to star connection. By means of a quick-acting regulator the voltage of all the generators of a common excitation dynamo is so influenced that the ratio of voltage to frequency on the busbars remains approximately constant, a matter which can be fairly readily accomplished with the means available nowadays. Referring to continuous operating conditions with a varied number of generators, this quick-acting regulator would under certain circumstances be unnecessary, because as already mentioned, this form of regulation has the object of approximately maintaining a constant excitation current. It is, however, an advantage to have a quick-acting regulator when switching generators in and out. When the excitation is interrupted the propelling motor always has a somewhat greater slip than normal during this period, whilst when the excitation is switched in again after successful switching manipulation, the line voltage at a constantly adjusted excitation current is greatly reduced as a result of the larger current consumption of the propelling motor, and this continues until the propelling motor has attained its normal slip again. When a quick-acting regulator is available this temporarily strengthens the excitation current and thereby greatly accelerates the return of the propelling motor to normal slip and continuous operating conditions, this being necessary for the correct operation of the control arrangements. Without a quick-acting regulator or temporary increase in the excitation current by hand it can occur that the propelling motor "wanders" for an inadmissable period with very great slip and this must certainly be avoided.

When reversing, the conditions as regards regulating the excitation are different. Generally it will be desired that the motor driving the propeller be reversed at the highest possible torque. It is a feature of power transmission by commutatorless machines with rotating fields that the propelling motor, the transformation losses being disregarded, can only produce that torque which the Diesel engines driving the generators can at the same time develop. If thus the propelling motor has to reverse at the rated torque, the Diesel engines have to develop that rated torque. For given motor characteristics the magnitude of the reversing torque is now dependent upon the magnitude of the line voltage during reversing. The greater the excitation is made, the greater is the power obtained from the Diesel sets and the greater the reversing torque of the propelling motor.

According to a further way of performing the invention the excitation of the generators is adjusted so that during the reversing process the speed of the Diesel engines is reduced by the braking action, whereupon a large part of the kinetic energy of the Diesel sets is utilized for the formation of torque in the propelling motor and on the other hand the return of the propelling motor to a low slip at low speed and thereby in a short time and with a small propeller counter torque occurs. The braking of the Diesel sets therefore reduces their speed to a value at which they can still approximately produce the rated torque. The advantage thus obtained is that a large part of the kinetic energy of the Diesel sets is made available for supplementing the torque of the propelling motor. Assuming, for example, that prior to reversing, the ship is travelling with a relative torque of 100 and a relative speed of 100, and if it is arranged that during reversing the Diesel sets are reduced to a relative speed of 40, hen in addition to the normal output of the Diesel engines.

$$\frac{100^2-40^2}{100^2} \cdot 100 = 84\%$$

of the kinetic energy of the Diesel sets is available for producing torque at the propelling motor.

Figure 4:
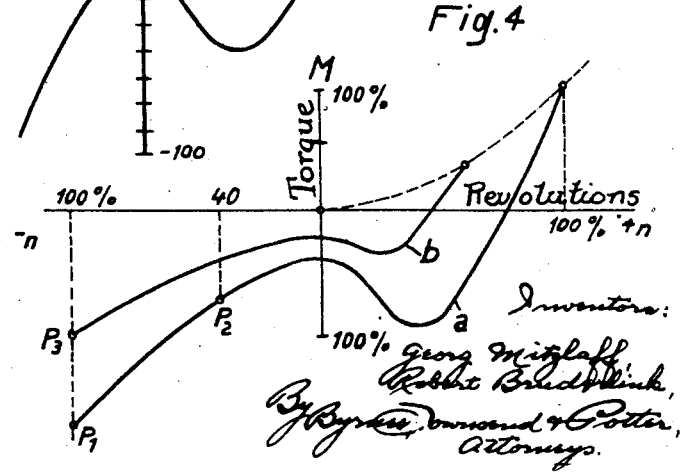
Fig. 4 is a graphical illustration of the relation of propeller torque to speed during reversing.

From another point of view the braking of the Diesel sets during reversing is also desired. The curve $a$ in Fig. 4 shows the torque M on the propeller to a base of propeller speed $n$ during reversing, on the assumption that during the reversal of the direction of rotation of the ship's shaft, the ship maintains its full speed in the former direction. According to this the propelling motor at 100% speed in the other direction must produce a torque which far exceeds the rated torque and which it is not capable of producing (point $P_1$). If now, however, the braking action brings the Diesel sets down to about 40% of their original frequency, then the propelling motor runs into the rated slip already at 40% of the speed, whereupon the torque required, as shown in the figure, does not exceed the rated torque (point $P_2$). The actual reversing is thereby completed, and the further running up to speed occurs at the same rate as the increase in the line frequency and the increase in speed of the generators. Furthermore the propelling motor has already acquired its rated slip and also its admissable temperature rise for the rotor. If the braking action on the Diesel engines and the accompanying reduction in line frequency did not ensue, then the propelling motor would have to run with a large slip and high temperature rise in the rotor until the ship's travel has been so much reduced that the propeller torque corresponded somewhat to the curve $b$ (point $P_3$). Since the torque of the Diesel engines decreases rapidly as soon as the Diesel engine speed falls below the limit speed at which full torque can be developed, it might occur that the Diesel sets are unintentionally brought to a standstill by the braking action as a result of too strong an excitation of the generators during reversing. This is prevented according to a further development of the invention, by which the regulating device 24 is provided which weakens the excitation when aforesaid admissible minimum speed of the Diesel sets is passed, so that a further reduction in speed cannot occur. For example a quick-acting regulator can be used in which the regulating coil is actuated by the voltage of one of the tachometer dynamos of the Diesel sets, and when the value falls below the corresponding limit value of this tachometer voltage an additional resistance is switched into the exciter circuit of the exciter machine, so that the exciting current of the generators is thereby weakened and a further fall in the speed of the Diesel sets is prevented. Instead of a quick-acting regulator relays can of course also be used which operate in a similar manner.

As already mentioned, the release of the kinetic energy from the Diesel sets means a valuable increase in available energy in the system and hence in torque, when reversing. It is, however, not necessary that this extra energy in the system be distributed evenly during the entire reversing period, as would approximately be the case when the excitation is maintained constant during reversing. It is rather an advantage to control the release of kinetic energy according to definite laws and this is best accomplished by the use of automatic devices. It is particularly advantageous that the braking of the Diesel sets, and hence the supply of additional effective power to the propelling motor should not occur immediately but rather later, that is, shortly before the instant when the direction of rotation of the propeller shaft is reversed. With this object in view reversing should be allowed to commence with a comparatively small excitation current and only after the propeller shaft has attained a definite speed should the excitation be increased. This can, for example, be achieved automatically by means of a switch apparatus 25 actuated from the propeller shaft which increases a resistance in the excitation circuit when the speed of the propeller shaft is small. Care must then be taken that this resistance remains short-circuited until the reversing process is completed. This last described procedure of controlling the release of the kinetic energy of the Diesel sets during reversing is only mentioned as an example.

The same considerations and factors which are taken into account for reversing are also valid when the ship has been started into motion. Also in this case it is an advantage when by means of a suitably selected excitation the Diesel sets are brought down as far as possible so that their effective power assists the propeller torque and furthermore the propelling motor acquires the rated slip at a low speed in a short time. Similarly here a switch apparatus actuated from the propeller shaft will strengthen the excitation current in the desired sense at a low propeller shaft speed. This automatic protective device is also necessary here to prevent the braking action bringing the Diesels to a standstill.

It has already been mentioned that it is a special advantage, out of consideration for the safety of the installation, to equip the propelling motor with a short-circuited rotor which due to a special construction according to the current concentration principle (eddy current or squirrel-cage rotor) is capable of developing the necessary torque during starting and reversing. With such a plant, reversing from full speed ahead to full speed astern provides an important and difficult case in the operation of the plant. The simplest way of reversing is to interchange two leads to the propelling motor while the voltage supply to the plant is temporarily interrupted and then to excite the generators again. The asynchronous motor then passes through the range of operation from slip $S=2$ (200%) to $S=0$. The torque exerted by the propelling motor must then retard and accelerate the rotating mass of the propeller shaft and also overcome the counter torque exerted by the water on the propeller. The approximate curve followed by this latter torque on a basis of speed is shown in Fig. 2.

In order to produce the necessary torque the propelling motor must conduct about 2.5 to 4 times the rated current. The ensuing heat developed in the rotor of the propelling motor is, especially during the braking period $S=2$ to $S=1$, extraordinarily great. This is due to the fact that during this braking period the rotor is supplied with mechanical power from the shaft and also with electrical energy over the air gap from the stator, both forms of energy having a heating effect in the rotor. When the motor is run up again from $S=1$ to $S=0$, that is, from zero to full speed, the total heating effect developed for the same torque is considerably smaller.

The following indicates a way in which the particularly large heating effects of the current during the braking period, which under certain circumstances might even prohibit the use of a squirrel-cage rotor, can be considerably reduced. The new method consists in exciting the stator of the propelling motor with direct current during the braking period by moving the switch H into contact with the leads G shown in Fig. 7.

Figure 5:
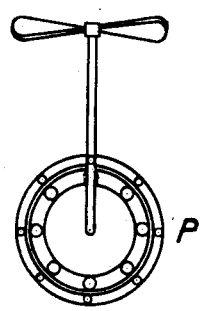
Fig. 5 is a graphical illustration of the theoretical relation of torque to speed in a system using a slip ring motor upon direct current excitation thereof.
Figure 5:
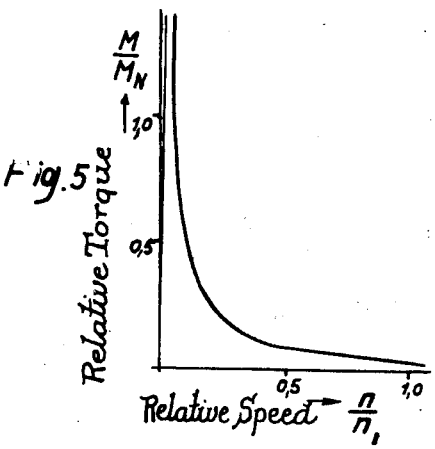

When the propelling motor has an ordinary squirrel-cage rotor it can then be compared with a short-circuited multi-phase synchronous machine. Fig. 5 shows the curve of relative torque $$\frac{M}{M1}$$

on a basis of relative speed $$\frac{n}{n1}$$

which is to be expected with a direct-current excitation of three times the rated value with a very large motor having a (short-circuited) slip-ring rotor. This torque would be too small and the method is a practical impossibility. Compared with this the properties of an eddy current or squirrel-cage rotor have, however, the effect of the terminals of the multi-phase generator not being short-circuited but rather of being connected to an ohmic resistance and reactance connected in parallel.

Figure 6:
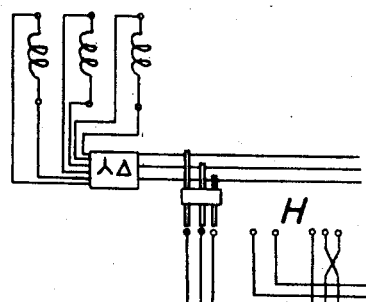
Fig. 6 is a graphical illustration of the operation of a motor constructed and operated according to the invention.
Figure 6:
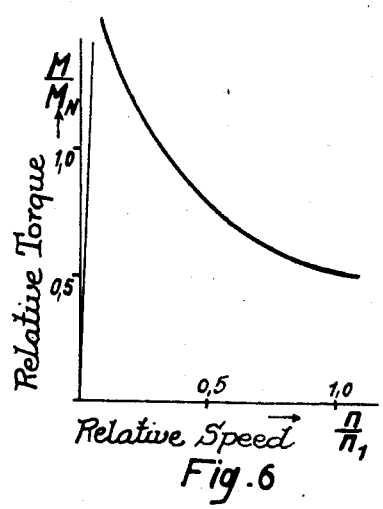

When the squirrel-cage rotor is constructed according to the current concentration principle, for about the same direct-current excitation, the curve is as shown in Fig. 6. It can be clearly seen that for the purpose intended this is particularly suitable. For a definite speed the torque varies as the square of the direct current in question.

With this new method the heating effect developed during the braking period is smaller because in the rotor winding only the equivalent of the power transmitted from the water through the propeller and the retardation power of the rotating mass of the propeller shaft are converted into heat produced by the current. With the previously described method, as already mentioned, energy is also transferred from the stator to the rotor, which is not the case here.

The difference between the magnitude of the heating effect can also be easily represented by formulæ. If M is the mechanical torque (torque of the water plus retardation torque) and $n$ the speed of the propeller shaft at a certain instant, then according to the new method the heat effect Q produced in the rotor by the current during one unit of time is $$Q = M2\pi n$$

According to the method first described, when reversing by altering the direction of rotation of the field the power due to current heating is $$Q^1 = M_1 \pi n \frac{S}{S-1}$$

which can be readily proved from the general working equations for rotating field machines. The ratio $$\frac{S}{S-1}$$

is for all values of S between 2 and 1 greater than 1.

The direct-current excitation of the stator winding of asynchronous motors for braking purposes is already known, but up to the present this method has only been applied to slip-ring motors with an external resistance switched into the rotor circuit because with ordinary short-circuited rotors only a very small torque is obtainable at the higher speeds.

Figure 7:
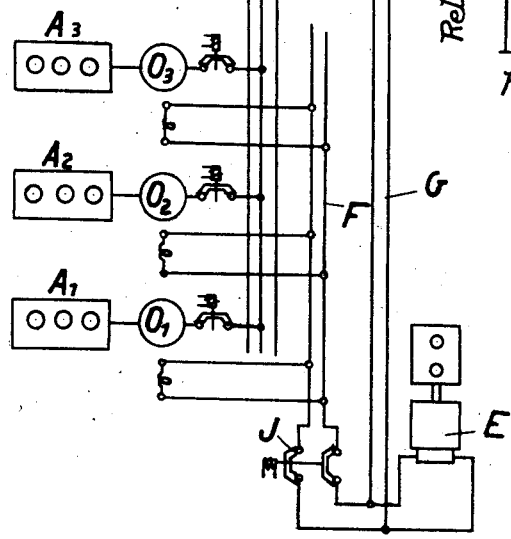
Fig. 7 is a diagrammatic illustration of a single Diesel-electric plant according to the invention.

Fig. 7 illustrates briefly the system of connections employed for this form of the invention.

The Diesel engines $A_1$, $A_2$, $A_3$ each drive a coupled synchronous generator $O_1$, $O_2$, $O_3$. The synchronous generators operate on the busbar system L, which leads to the propelling motor P. The synchronous generators O are excited from the excitation machine E through the excitation busbars F. It is an advantage to use the same excitation machine also for supplying the stator winding of the propelling motor P during the braking period. There is no risk attached if, when necessary this winding is considerably overloaded during this short period.

For this purpose a conductor G is provided which leads to the middle contacts of the reversing switch H. When reversing, the reversing switch is first moved out of the position "ahead" shown, into the middle or braking position. Simultaneously the excitation of the synchronous machines is interrupted by the switch J. After the propelling motor P has practically been brought to a standstill by the braking action, the reversing switch H is moved further into the other end position "astern", and at the same time by closing the switch J the generators O are excited again.

In many cases, especially with ships having several propellers, it is desirable to be able to bring one propeller to a standstill when the ship is moving, so that inspection or repairs can be undertaken. By means of the direct-current excitation according to the invention it is quite easy by braking to reduce the propeller shaft speed, although not to zero, but to a value which amounts to a fraction of a revolution per minute, and in many cases this suffices. In order to maintain the propeller shaft speed extremely low when the ship is moving it is necessary to have a direct-current excitation which hardly exceeds the rated current strength of the stator and which, when the propelling motor is equipped with separate ventilation can be maintained as long as required. Since the direct current excitation enables the propeller shaft speed to be reduced to an exceptionally low value, it is sufficient to have a comparatively simple and cheap mechanical brake to bring the propeller shaft to a complete standstill if required. After the mechanical brake has come into operation the direct-current excitation can be switched off.

By the expression "principal switching operation" in the appended claims is meant the switching in or out of generators, changing generator or motor windings from star to delta, or vice versa, changing pole connections, reversing motors or any other switching operation involving the field or armature circuits of the generators or driving motors, or the bus bars, or which affects the operation of any of the motors or generators.

What we claim is:—

1. The method of controlling a ship-propulsion system of the type including a propeller motor and a plurality of power units for energizing said motor, each unit including a prime mover and a generator driven thereby, characterized in that, during any principal switching operation, the excitation is interrupted of all of those generators the operation of which is affected by the switching operation.

2. A method of controlling an electric drive for a ship wherein a number of Diesel engine synchronous generator groups supply current to one or more propeller motors which method comprises de-energizing the fields of all the generators which are in action before the control operation, making the control connections for the desired new conditions of running and re-energizing the fields of the generators which are to operate under the new conditions.

3. The method of controlling a ship-propulsion system of the type including a propeller motor and a plurality of power units for energizing said motor, each unit including a prime mover and a generator driven thereby, which method comprises connecting one or more of said power units to or disconnecting one or more power units from said motor to alter the energy supply to said motor from one group of one or more units to a second group of one or more units, and interrupting the field excitation of all generators of both of said groups of units during the said connecting or disconnecting operation.

4. The method as set forth in claim 3, wherein all of the power units are operated at a common no-load speed substantially in excess of the normal load speed.

5. The method of controlling a ship-propulsion system of the type including a propeller motor and a plurality of power units for energizing said motor, each unit including a prime mover and a generator driven thereby, which method comprises interrupting the excitation of the generators which are connected to the motor and of one or more generators which are those which are to be connected to the motor, connecting to the motor said generators which are to be connected and thereafter reestablishing the excitation of the generators then connected to the motor.

6. The method of controlling a ship-propulsion system of the type including a propeller motor of the induction type and a plurality of power units for energizing said motor, each unit including a prime mover and a synchronous generator driven thereby, which method comprises, interrupting the excitation of the generators which are connected to the motor and of one or more generators which are those which are to be connected to the motor, connecting to the motor said generators which are to be connected and thereafter reestablishing the excitation of the generators then connected to the motor.

7. The method of controlling the speed of a ship-propulsion system of the type which includes a propeller motor and a plurality of power units for energizing said motor, each unit including a prime mover and a generator driven thereby, which method comprises connecting or disconnecting from the motor, as required, one or more of said generators to effect an approximate regulation of the speed of the system and varying the common no-load speed of the prime movers, as required, to effect an exact speed regulation of the system.

8. A ship-propulsion system comprising a propeller motor, a plurality of power units for energizing said motor, each unit including a prime mover and a generator driven thereby, means for selectively connecting one or more of said generators to said motor, speed governing means for each of said prime movers and means coupling together all of said speed governing means for simultaneous adjustment thereof.

9. The method of controlling a ship-propulsion system of the type including at least two propellers, a propeller motor driving each propeller, a plurality of power units for energizing each motor, each unit including a prime mover and a generator, which method comprises, reversing the direction of drive of the system by interrupting the excitation of the generators connected to the motors, reversing one of the motors, connecting all of the generators in parallel, reestablishing the excitation of the generators which are connected to the motors, again interrupting the excitation of the connected generators when the reversed motor attains approximately normal speed in the reversed direction, reversing the direction of a second motor, and reestablishing the excitation of the connected generators.

10. The method as set forth in claim 9, wherein, upon the re-energization of the generator excitation following the reversal of each motor, the excitation is temporarily increased to a value substantially in excess of its normal value.

11. A ship-propulsion system comprising a propeller motor, a plurality of power units for energizing said motor, each unit including a prime mover and a generator driven thereby, means for selectively connecting one or more of said generators to said motor, and means active upon the initiation of any principal switching operation for de-energizing the excitation of the generators affected by the switching operation.

12. The method of controlling a ship-propulsion system of the type including a propeller motor and a plurality of power units for energizing the motor, each of said units including a prime mover and a generator driven thereby, characterized in that, during starting or reversing of the motor, the excitation of the generators is increased to a predetermined value substantially in excess of its normal value.

13. The invention as set forth in claim 12, wherein the excitation of the generators is increased sufficiently to reduce the speed of the power units to approximately 40% of the normal no-load speed.

14. The invention as set forth in claim 12, wherein the excitation of the generators is progressively increased to the said predetermined excess value.

15. The method of controlling a ship-propulsion system of the type including a propeller motor of the short-circuited rotor induction type and a plurality of power units for energizing the motor, each unit including a prime mover and a generator, characterized in that upon reversal of the motor, the excitation of said generators is interrupted and the stator of the propeller motor is excited by direct current until the speed of the motor is reduced substantially to zero.

GEORG MITZLAFF.
ROBERT BRUDERLINK.